US012600465B2

(12) United States Patent
Westermeier et al.

(10) Patent No.: US 12,600,465 B2
(45) Date of Patent: Apr. 14, 2026

(54) WINGLET SYSTEMS AND METHODS FOR AIRCRAFT

(71) Applicant: THE BOEING COMPANY, Arlington, VA (US)

(72) Inventors: Ross Westermeier, Seattle, WA (US); Paul Edward Black, Seattle, WA (US); Billy P. Tung, Kent, WA (US); Peter Schupp, Seattle, WA (US); Scott Vincent Pugh, Auburn, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/443,589

(22) Filed: Feb. 16, 2024

(65) Prior Publication Data

US 2025/0263165 A1 Aug. 21, 2025

(51) Int. Cl.
 *B64C 23/06* (2006.01)
 *B64C 3/26* (2006.01)
 *B64C 5/08* (2006.01)

(52) U.S. Cl.
 CPC .............. *B64C 23/076* (2017.05); *B64C 5/08* (2013.01); *B64C 3/26* (2013.01)

(58) Field of Classification Search
 CPC ... B64C 23/065; B64C 23/069; B64C 23/072; B64C 23/076; B64C 5/08
 See application file for complete search history.

(56) References Cited

U.S. PATENT DOCUMENTS

| | | | | |
|---|---|---|---|---|
| 2,846,165 A | * | 8/1958 | Axelson .................... | B64C 5/08 |
| | | | | 244/199.4 |
| 4,722,499 A | * | 2/1988 | Klug ..................... | B64C 23/076 |
| | | | | 244/45 R |
| 5,407,153 A | * | 4/1995 | Kirk ..................... | B64C 23/069 |
| | | | | 244/199.4 |
| 7,237,750 B2 | * | 7/2007 | Chiu ..................... | B64U 30/14 |
| | | | | 244/119 |
| 7,975,965 B2 | * | 7/2011 | Ackermann .......... | B64C 23/069 |
| | | | | 244/131 |
| 8,544,800 B2 | * | 10/2013 | Stuhr .................... | B64C 23/069 |
| | | | | 244/199.4 |
| 9,452,825 B2 | * | 9/2016 | Witte ........................ | B64C 5/08 |
| 9,714,080 B2 | * | 7/2017 | Bradshaw ................ | B64C 5/08 |
| 9,738,375 B2 | * | 8/2017 | Witte .................... | B64D 45/02 |

(Continued)

FOREIGN PATENT DOCUMENTS

| | | |
|---|---|---|
| EP | 2792595 | 5/2018 |
| GB | 2661708 | 1/2018 |

OTHER PUBLICATIONS

Extended European Search Report for EP App. No. 25157156.8-1009, dated Jun. 3, 2025.

*Primary Examiner* — Michael H Wang
*Assistant Examiner* — Michael B. Kreiner
(74) *Attorney, Agent, or Firm* — Joseph M. Butscher; Carroll, Hoette & Butscher, LLC

(57) ABSTRACT

A winglet system is configured to be secured to a wing of an aircraft. The winglet system includes an upper blade, a lower blade, and a cover plate integrally formed with the upper blade and the lower blade. The cover plate covers an opening within a transition joint between the upper blade and the lower blade. The cover plate remains coupled to the upper blade if the lower blade is separated from the winglet system.

21 Claims, 6 Drawing Sheets

(56)     References Cited

U.S. PATENT DOCUMENTS

| | | | | |
|---|---|---|---|---|
| 10,597,145 B2 * | 3/2020 | Paisley | ..................... | B64C 3/26 |
| 10,676,175 B2 * | 6/2020 | Moore | ..................... | B64F 5/10 |
| 10,767,682 B2 * | 9/2020 | Leon | ..................... | F16B 41/002 |
| 12,097,954 B2 * | 9/2024 | Edwards | ................. | B64C 3/185 |
| 12,103,665 B2 * | 10/2024 | Szarek | ..................... | B64D 7/08 |
| 2012/0112005 A1 * | 5/2012 | Chaussee | ............. | B64C 23/072 |
| | | | | 244/123.1 |
| 2017/0341737 A1 | 11/2017 | Paisley | | |
| 2019/0003511 A1 | 1/2019 | Leon | | |
| 2020/0094947 A1 | 3/2020 | Commis | | |

* cited by examiner

WINGLET SYSTEMS AND METHODS FOR AIRCRAFT

FIELD OF THE DISCLOSURE

Examples of the present disclosure generally relate to winglet systems and methods for aircraft, such as are disposed at ends of wings.

BACKGROUND OF THE DISCLOSURE

Certain aircraft include winglets extending from distal ends of main wing structures. Winglets are configured to reduce drag, such as by partially recovering tip vortex energy. Various winglets are configured to increase lift generated at the wingtip (by smoothing airflow across the upper wing near the tip) and reduce lift-induced drag caused by wingtip vortices, thereby improving lift-to-drag ratio.

Known winglets include an upper blade and a lower blade. The lower blade extends downwardly in relation to a tip of a wing, thereby reducing ground clearance relative to the tip of the wing. As such, the lower blade may be susceptible to accidental impacts, such as from ground service vehicles at airports. In such circumstances, the lower blade may be removed. The aircraft can be temporarily flown without the lower blade after a separate and distinct structure is separately installed over an opening caused by removal of the lower blade.

As can be appreciated, the process of obtaining and installing a separate and distinct structure over the opening is time and labor intensive, and can be costly.

SUMMARY OF THE DISCLOSURE

A need exists for an improved winglet. Further, a need exists for a system and a method for effectively and efficiently compensating for a removed lower blade of a winglet.

With those needs in mind, certain examples of the present disclosure provide a winglet system configured to be secured to a wing of an aircraft. The winglet system includes an upper blade, a lower blade, and a cover plate integrally formed with the upper blade and the lower blade. The cover plate covers an opening within a transition joint between the upper blade and the lower blade. The cover plate remains coupled to the upper blade if the lower blade is separated from the winglet system.

In at least one example, the cover plate includes a covering panel disposed within the opening, and one or more couplers extending from the covering panel. As an example, the one or more couplers include a first coupler (such as an aft or forward coupler), and a second coupler (such as a forward or aft coupler). In at least one example, the one or more couplers include legs separated by a gap.

In at least one example, the lower blade includes one or more attachment fittings secured to the one or more couplers. As a further example, the covering panel includes one or more channels. The one or more attachment fittings extend through the one or more channels. In at least one example, the one or more attachment fittings are secured to the one or more couplers through one or more frangible fasteners.

In at least one example, the upper blade includes one or more attachment fittings secured to the one or more couplers. As a further example, the one or more couplers secure to one or more first attachment fittings of the upper blade through one or more first fasteners. The one or more couplers secure to one or more second attachment fittings of the lower blade through one or more second fasteners. The one or more first fasteners are different than the one or more second fasteners. In at least one example, the one or more first attachment fittings do not extend to or contact the one or more second attachment fittings.

In at least one example, at least one fastener secures the one or more couplers to one or more first attachment fittings of the upper blade and one or more second attachment fittings of the lower blade. As a further example, one or more retaining fasteners secure the one or more couplers to the one or more first attachment fittings of the upper blade. The one or more retaining fasteners do not connect to the one or more second attachment fittings of the lower blade.

Certain examples of the present disclosure provide a method for a winglet system configured to be secured to a wing of an aircraft. The method includes integrally forming a cover plate with an upper blade and a lower blade.

Certain examples of the present disclosure provide an aircraft including a fuselage, wings extending from the fuselage, and a winglet system secured each of the wings, as described herein.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

As described herein, examples of the present disclosure provide a winglet system including an integrated cover plate disposed between an upper blade and a lower blade. The integrated cover plate is not separate and distinct from the winglet system. Instead, the cover plate is integrally formed with the winglet system. The winglet system allows for an aircraft to be flown without a lower blade, and without installation of a separate and distinct covering structure. The winglet system further includes frangible attach points for the lower blade while incorporating the cover plate.

Figure 1:
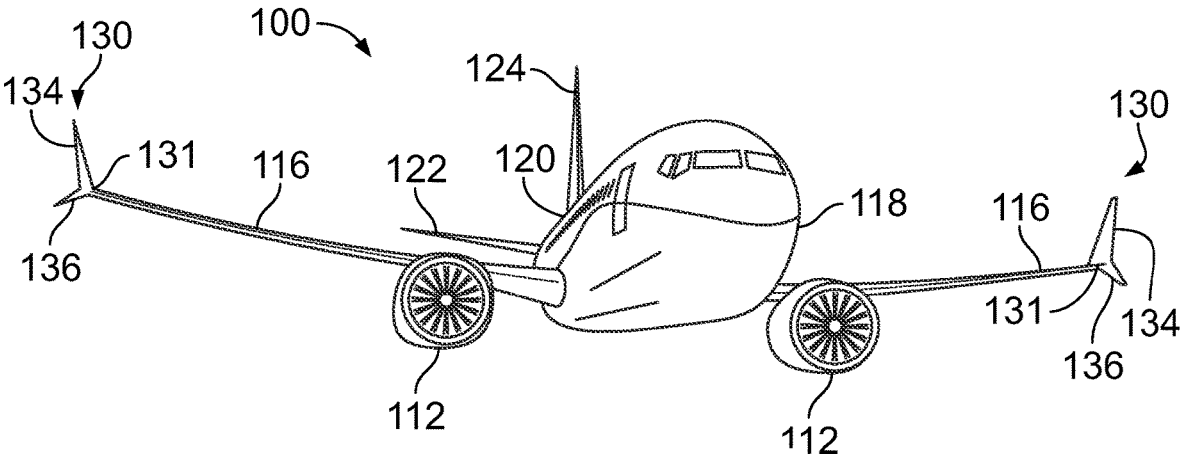
FIG. 1 illustrates a perspective front view of an aircraft, according to an example of the present disclosure.

FIG. 1 illustrates a perspective front view of an aircraft 100, according to an example of the present disclosure. The aircraft 100 includes a propulsion system, such as can include two engines 112, for example. Optionally, the propulsion system may include more engines 112 than shown. The engines 112 are carried by wings 116 of the aircraft 100. In other examples, the engines 112 may be carried by a fuselage 118 and/or an empennage 120. The empennage 120 may also support horizontal stabilizers 122 and a vertical stabilizer 124.

A winglet system 130 is secured to a distal end 131 of each wing 116. Each winglet system 130 includes an upper blade 134 and a lower blade 136. The upper blade 134 extends upwardly above a plane of an upper surface of the wing 116. The lower blade 136 extends downwardly below the plane of the upper surface of the wing 116.

The aircraft 100 shown in FIG. 1 is merely an example. The aircraft 100 can be sized and shaped differently than shown in FIG. 1.

Figure 2:
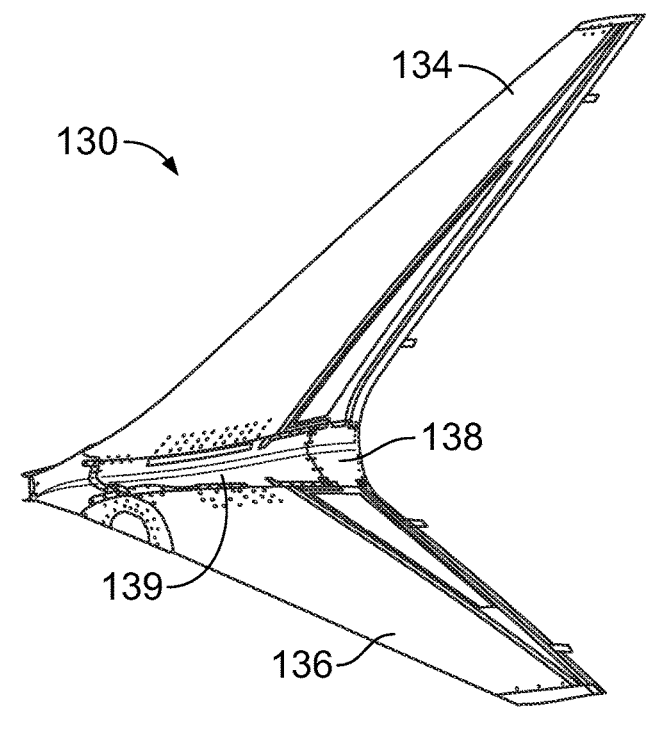
FIG. 2 illustrates a perspective side view of a winglet system, according to an example of the present disclosure.

FIG. 2 illustrates a perspective side view of a winglet system 130, according to an example of the present disclosure. The winglet system 130 includes the upper blade 134 coupled to the lower blade 136 at a transition joint 138, which can include an upper covering fairing 139.

Figure 3:
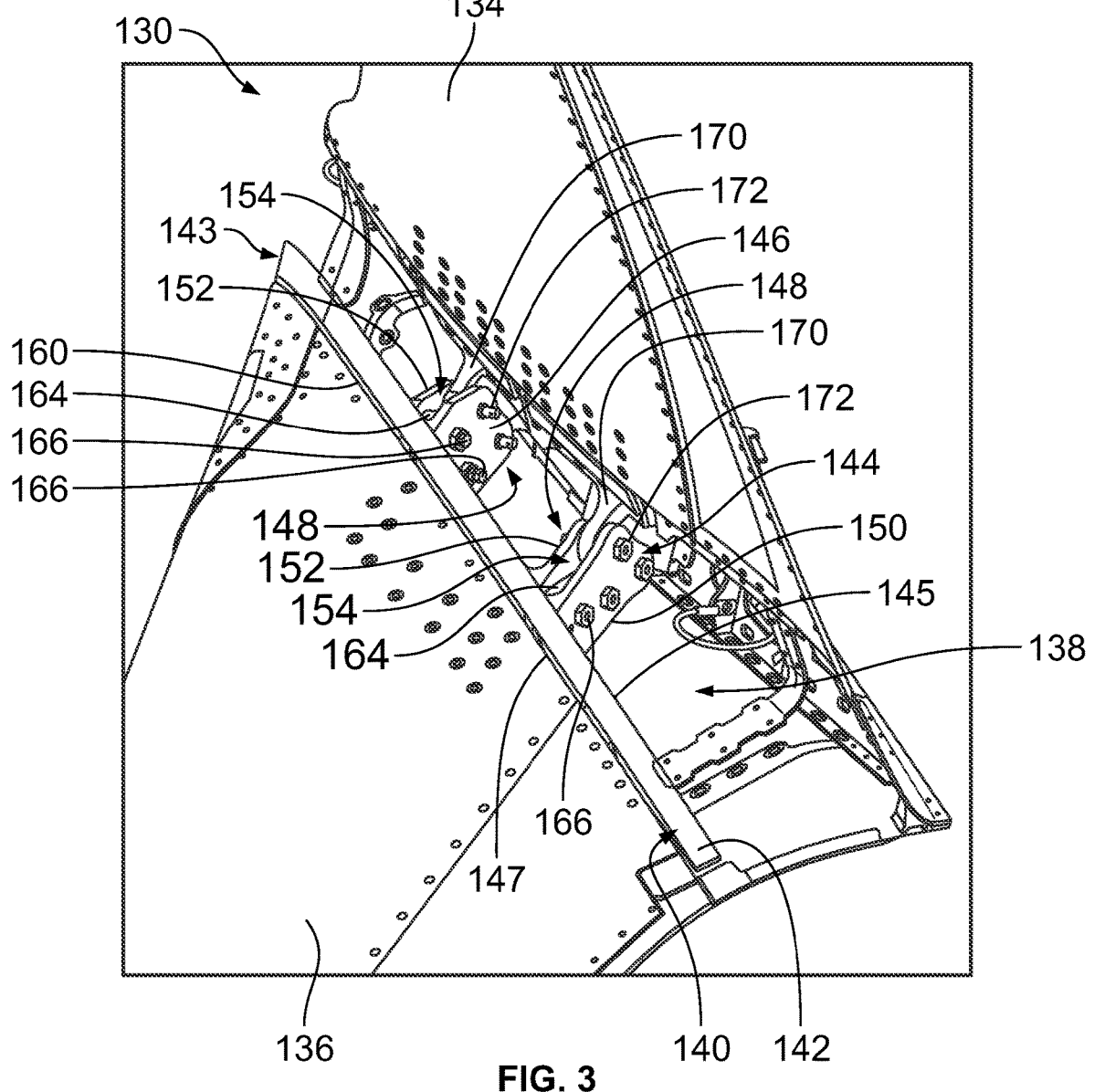
FIG. 3 illustrates a perspective top view of the winglet system at a transition joint, according to an example of the present disclosure.

FIG. 3 illustrates a perspective top view of the winglet system 130 at the transition joint 138, according to an example of the present disclosure. The upper covering fairing 139 (shown in FIG. 2) is not shown in FIG. 3.

The winglet system 130 includes a cover plate 140, which is integrally formed with the winglet system 130. That is, the cover plate 140 is an integral part of the winglet system 130, and is not separately installed thereto, such as if the lower blade 136 is removed.

The cover plate 140 includes a covering panel 142 disposed within an opening 143 of the transition joint 138. A first coupler 144 extends inwardly from an inboard surface 145 of the covering panel 142. The first coupler 144 can be an aft coupler. An second coupler 146 also extends inwardly from the inboard surface 145 of the covering panel 142. The second coupler 146 can be a forward coupler. Optionally, the first coupler 144 can be a forward coupler, and the second coupler 146 can be an aft coupler. The inboard surface 145 is opposite from an outboard surface 147. The first coupler 144 and the second coupler 146 are spaced apart a distance 148. Each of the first coupler 144 and the second coupler 146 includes coupling legs 150 and 152 separated by a gap 154. The cover plate 140 can include fewer or more couplers than shown. For example, the cover plate 140 can include a single coupler. As another example, the cover plate 140 can include three couplers.

A proximal end 160 of the lower blade 136 is proximate to (such as abuts against) the outboard surface 147 of the covering panel 142. The lower blade 136 includes attachment fittings 164, which extend through channels formed through the covering panel 142. Each attachment fitting 164 extends between coupling legs 150 and 152 of one of the first coupler 144 or the second coupler 146. One or more fasteners 166, such as bolts, secure the attachment fittings 164 to the first coupler 144 and the second coupler 146. The fasteners 166 are non-frangible.

The upper blade 134 also includes attachment fittings 170. Each attachment fitting 170 extends between coupling legs 150 and 152 of one of the first coupler 144 or the second coupler 146. One or more fasteners 172, such as bolts, secure the attachment fittings 170 to the first coupler 144 and the second coupler 146. In at least one example, the fasteners 172 are frangible fasteners (such as frangible bolts), which are configured to break at a predetermined force, to allow the lower blade 136 to separate from the winglet system 130. The frangible fasteners are configured to sustain flight loads, but break in response to predetermined excessive loads, such as from impacts of a certain magnitude. The fasteners 166 are configured to sustain greater loads than the fasteners 172. In this manner, the fasteners 166 ensure that the cover plate 140 remains secured to the winglet system 130, even if the frangible fasteners 172 break to allow the lower blade 136 to separate from the winglet system 130. Optionally, the fasteners 172 can be removable fasteners, instead of frangible fasteners.

As an example, if ground support equipment impacts the lower blade 136 with sufficient force, the lower blade 136 may need to be removed and repaired. For removal, the fasteners 166 can be removed so that the lower blade 136 can be removed, but the cover plate 140 remains in place.

Figure 4:
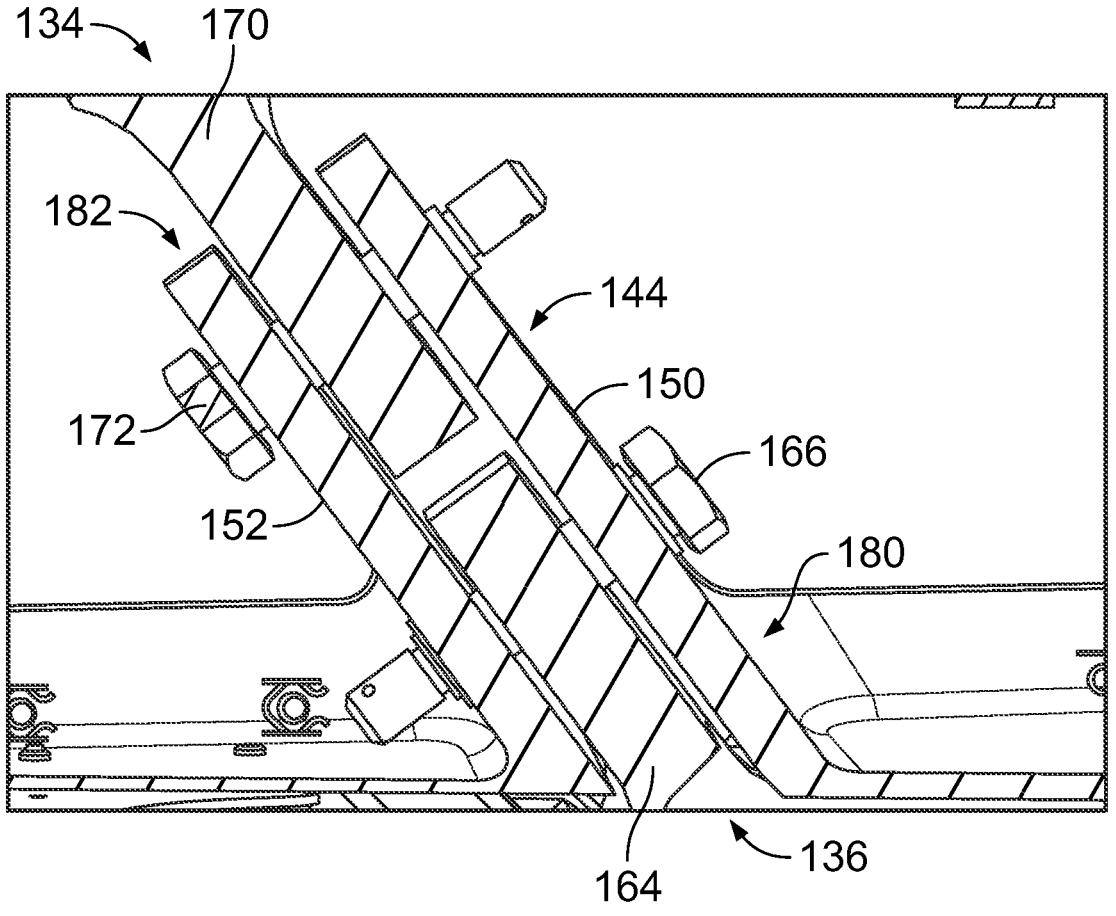
FIG. 4 illustrates a cross-sectional view of a coupler, according to an example of the present disclosure.

FIG. 4 illustrates a cross-sectional view of a coupler, according to an example of the present disclosure. The coupler can be the first coupler 144. The second coupler 146 can be similarly configured. The attachment fitting 164 extends between the legs 150 and 152 of the coupler at a first end 180, while the attachment fitting 170 extends between the legs 150 and 152 at an opposite second end 182. The attachment fitting 164 does not extend to, or contact, the attachment fitting 170. In this manner, in at least one example, the fasteners 166 that secure the coupler to the attachment fitting 164 do not contact the attachment fitting 170. Similarly, the fasteners 172 that secure the coupler to the attachment fitting 170 do not contact the attachment fitting 164.

As shown in FIG. 4, one or more couplers (such as the first coupler 144 and/or the second coupler 146) secure to one or more attachment fittings 170 of the upper blade 134 through one or more fasteners 172. The coupler(s) further secure to one or more attachment fittings 164 of the lower blade 136 through one or fasteners 172 (such as frangible bolts). The fasteners 172 are different than the fasteners 166.

Figure 5:
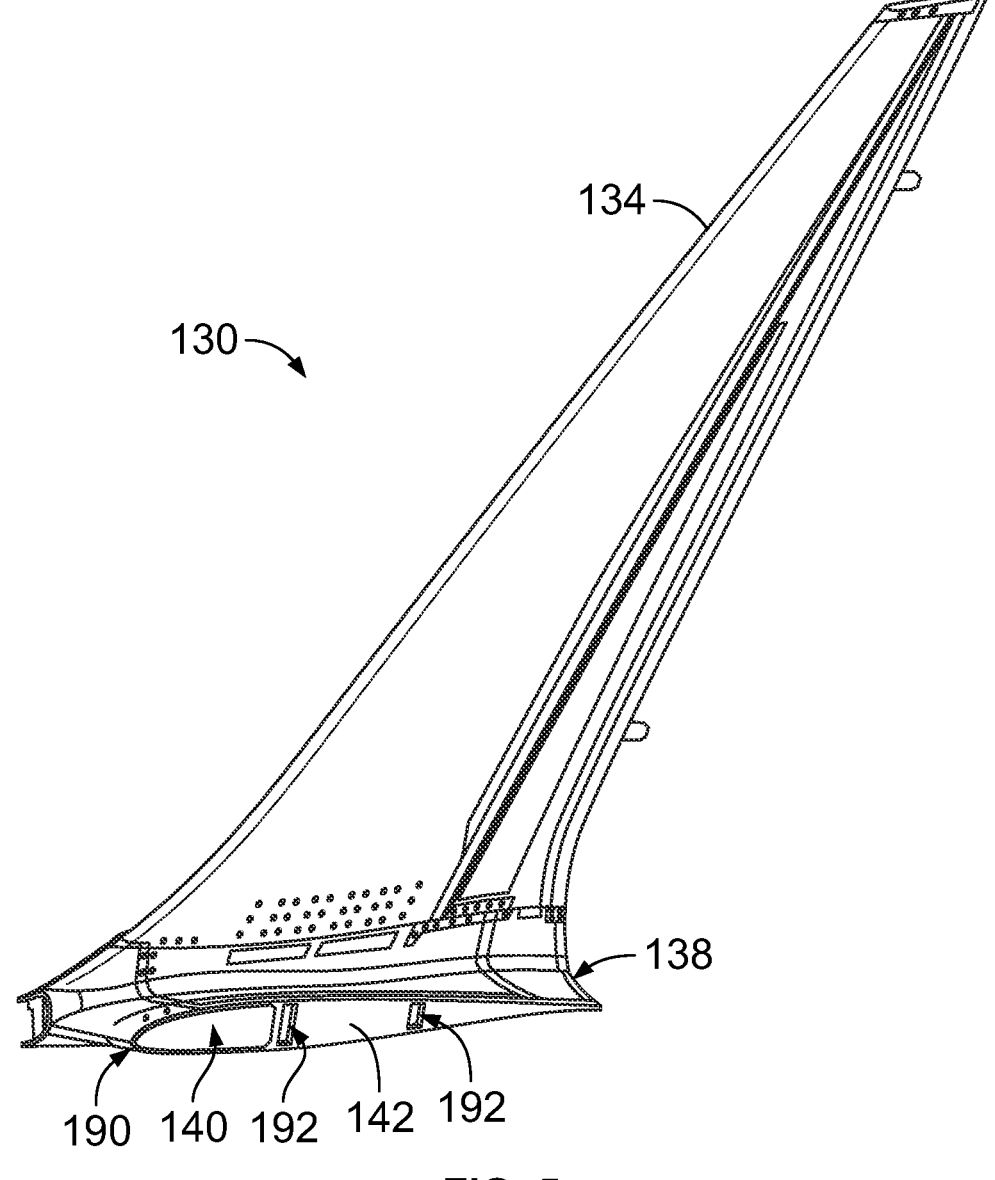
FIG. 5 illustrates a perspective side of the winglet system with a lower blade removed, according to an example of the present disclosure.

FIG. 5 illustrates a perspective side of the winglet system 130 with the lower blade removed, according to an example of the present disclosure. Referring to FIGS. 2-5, in the event the lower blade 136 is removed, the cover plate 140 remains within an opening 190 of the transition joint 138 of the winglet system 130. The covering panel 142 is configured to conform to the size and shape of the opening 190. As shown, the covering panel 142 has a profile shaped as an airfoil. As noted, the covering panel 142 includes channels 192 into which attachment fittings 164 are configured to pass.

In the event the lower blade 136 is removed from the winglet system 130, the cover plate 140, which is integrally formed with the winglet system 130, provides the covering panel 142 that covers the opening 190. As such, a separate and distinct covering structure does not need to be separately secured to the winglet system 130.

Figure 6:
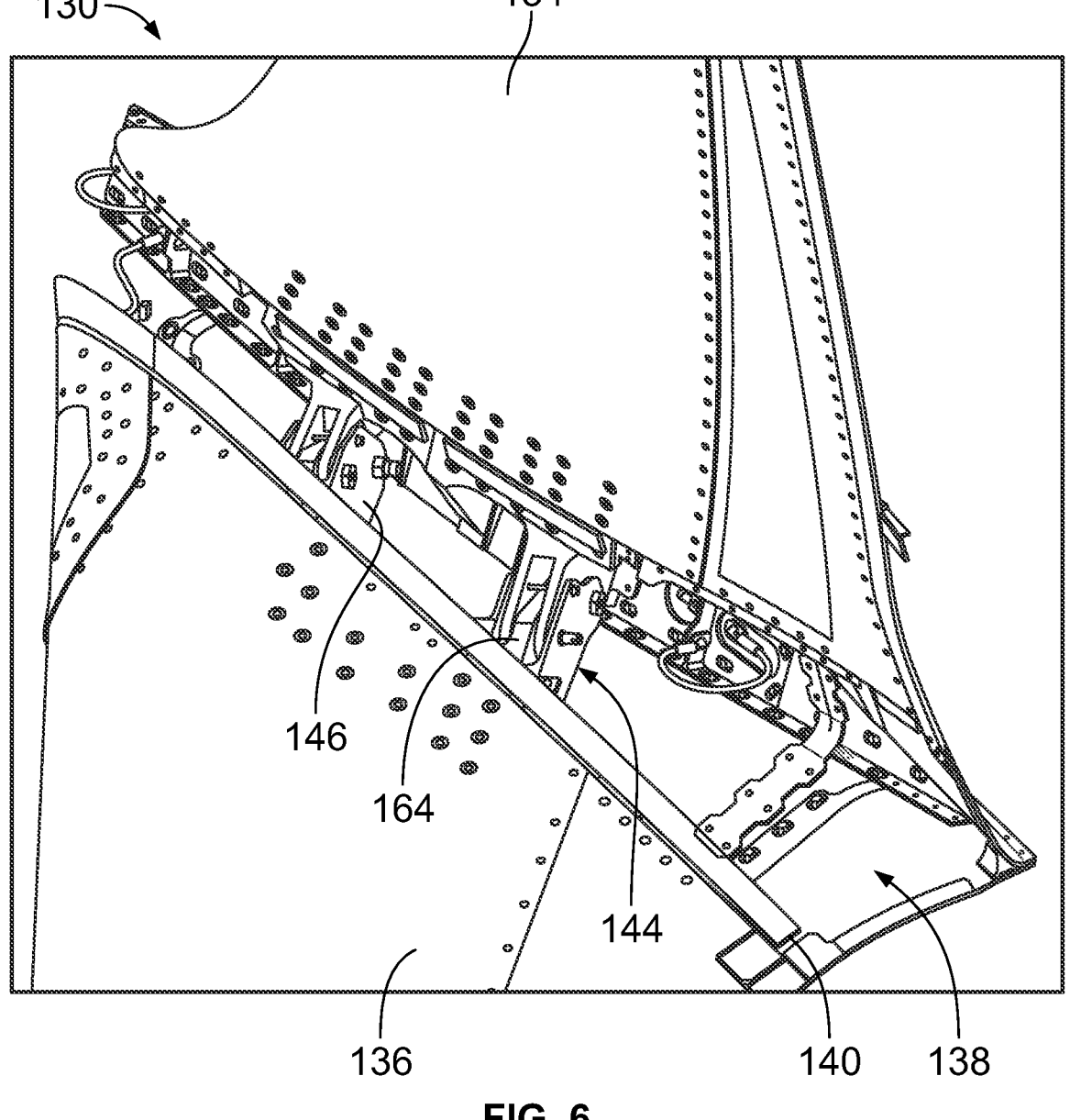
FIG. 6 illustrates a perspective top view of the winglet system at a transition joint, according to an example of the present disclosure.
Figures 7, 8:
FIG. 7 illustrates a top view of an aft coupler of a cover plate, according to an example of the present disclosure.
FIG. 8 illustrates a top view a forward coupler of the cover plate, according to an example of the present disclosure.

FIG. 6 illustrates a perspective top view of the winglet system 130 at the transition joint 138, according to an example of the present disclosure. FIG. 7 illustrates a top view of a second coupler 146 of the cover plate 140, according to an example of the present disclosure. FIG. 8 illustrates a top view a first coupler 144 of the cover plate 140, according to an example of the present disclosure.

Referring to FIGS. 6-8, in this example, the attachment fittings 170 of the upper blade 134 includes opposed fins 200 and 202 separated by a gap 204. The attachment fittings 170 extend between the legs 150 and 152. The attachment fittings 164 of the lower blade 136 extend between the fins 200 and 202. Fasteners 206, such as bolts, secure the couplers 144 and 146 to each of the attachment fittings 164 and 170. That is, each fastener 206 secures to each of the attachment fittings 164 and 170. In at least one example, the fasteners 206 are frangible, and configured to break at a predetermined force, thereby allowing the lower blade 136 to separate from the winglet system 130.

One or more retaining fasteners 220, such as bolts, secure one or both of the couplers 144 and/or 146 to the attachment fitting 170. In at least one example, the retaining fasteners 220 do not connect to, nor secure to the attachment fitting 164. The retaining fasteners 220 are configured to ensure that the cover plate 140 remains secured to the upper blade 134 in the event the lower blade 134 separates from the winglet system 130 (such as when the lower blade 134 is removed for repair or maintenance).

As shown, the first coupler 144 can include the retaining fastener 220, which provides an auxiliary connection with the attachment fitting 170 of the upper blade 134. The second coupler 146 may not include a retaining fastener 220. Optionally and/or additionally, the second coupler 146 may include the retaining fastener 220. In at least one example, both the first coupler 144 and the second coupler 146 can include a retaining fastener, such as the retaining fastener 220.

Referring to FIGS. 1-8, examples of the present disclosure provide a winglet system 130 having an integrally formed cover plate 140, which is configured to remain secured to the winglet system 130 when the lower blade 136 is separated from the winglet system 130. When the lower blade 136 separates from the winglet system 130, the cover plate 140 remains secured to the winglet system 130, such as within the opening 190 of the transition joint 138. As such, if the lower blade 136 does separate from the winglet system 130, the aircraft 100 can be still be flown, and there is no need for a separate and distinct cover structure to be installed on the winglet system 130. If the lower blade 136 does separate from the winglet system 130, thereby exposing the covering panel 142 within the opening 190, the exposed channels 192 of the covering panel 142 can be covered within a covering agent, such as speed tape.

As described herein, the winglet system 130 includes the cover plate 140, which provides an integrated split blade wing tip cover. The cover plate 140 is installed and integrally formed with the winglet system 130 when the winglet system 130 is manufactured. If there is an issue which requires removal of the lower blade 136, the cover plate 140 is already in place, and an operator of the aircraft does not need to acquire a separate and distinct covering structure in order to fly the aircraft. In at least one example, the cover plate 140 secures to one or more attachment fittings (individually or both) of the lower blade 136 with frangible fasteners 206, such as frangible bolts, while securing to one or more additional attachment points (such as portions of the attachment fittings 170 of the upper blade 134) with additional fasteners.

As described herein, referring to FIGS. 1-8, the winglet system 130 is configured to be secured to a wing 116 of the aircraft 100. The winglet system 130 includes the upper blade 134, the lower blade 136, and the cover plate 140 integrally formed with the upper blade 134 and the lower blade 136. That is, the winglet system 130 is manufactured having the cover plate 140 coupled to the upper blade 134 and the lower blade 136. The cover plate 140 is not separately secured to the winglet system 130 after the winglet system 130 is manufactured. The cover plate 140 covers the opening 190 within the transition joint 138 between the upper blade 134 and the lower blade 136. The cover plate 140 remains coupled to the upper blade 134 if the lower blade 136 is separated from the winglet system 130.

Further, the disclosure comprises embodiments according to the following clauses:

Clause 1. A winglet system configured to be secured to a wing of an aircraft, the winglet system comprising:

an upper blade;

a lower blade; and a cover plate integrally formed with the upper blade and the lower blade, wherein the cover plate covers an opening within a transition joint between the upper blade and the lower blade, and wherein the cover plate remains coupled to the upper blade if the lower blade is separated from the winglet system.

Clause 2. The winglet system of Clause 1, wherein the cover plate comprises:

a covering panel disposed within the opening; and one or more couplers extending from the covering panel.

Clause 3. The winglet system of Clause 2, wherein the one or more couplers comprise:

a first coupler; and a second coupler.

Clause 4. The winglet system of Clauses 2 or 3, wherein the one or more couplers comprise legs separated by a gap.

Clause 5. The winglet system of any of Clauses 2-4, wherein the lower blade comprises one or more attachment fittings secured to the one or more couplers.

Clause 6. The winglet system of Clause 5, wherein the covering panel comprises one or more channels, and wherein the one or more attachment fittings extend through the one or more channels.

Clause 7. The winglet system of Clauses 5 or 6, wherein the one or more attachment fittings are secured to the one or more couplers through one or more frangible fasteners.

Clause 8. The winglet system of any of Clauses 2-7, wherein the upper blade comprises one or more attachment fittings secured to the one or more couplers.

Clause 9. The winglet system of any of Clauses 2-7, wherein the one or more couplers secure to one or more first attachment fittings of the upper blade through one or more first fasteners, wherein the one or more couplers secure to one or more second attachment fittings of the lower blade through one or more second fasteners, and wherein the one or more first fasteners are different than the one or more second fasteners.

Clause 10. The winglet system of Clause 9, wherein the one or more first attachment fittings do not extend to or contact the one or more second attachment fittings.

Clause 11. The winglet system of any of Clauses 2-9, wherein at least one fastener secures the one or more couplers to one or more first attachment fittings of the upper blade and one or more second attachment fittings of the lower blade.

Clause 12. The winglet system of Clause 11, wherein one or more retaining fasteners secure the one or more couplers to the one or more first attachment fittings of the upper blade, and wherein the one or more retaining fasteners do not connect to the one or more second attachment fittings of the lower blade.

Clause 13. A method for a winglet system configured to be secured to a wing of an aircraft, the method comprising:

integrally forming a cover plate with an upper blade and a lower blade, wherein the cover plate covers an opening within a transition joint between the upper blade and the lower blade, and wherein the cover plate remains coupled to the upper blade if the lower blade is separated from the winglet system.

Clause 14. An aircraft comprising:

a fuselage;

wings extending from the fuselage; and a winglet system secured to each of the wings, the winglet system comprising:

an upper blade;

a lower blade; and a cover plate integrally formed with the upper blade and the lower blade, wherein the cover plate covers an opening within a transition joint between the upper blade and the lower blade, and wherein the cover plate remains coupled to the upper blade if the lower blade is separated from the winglet system.

Clause 15. The aircraft of Clause 14, wherein the cover plate comprises:

a covering panel disposed within the opening; and one or more couplers extending from the covering panel.

Clause 16. The aircraft of Clause 15, wherein the one or more couplers comprise:

a first coupler; and a second coupler.

Clause 17. The aircraft of Clauses 15 or 16, wherein the one or more couplers comprise legs separated by a gap.

Clause 18. The aircraft of any of Clauses 15-17, wherein the lower blade comprises one or more first attachment fittings secured to the one or more couplers, wherein covering panel comprises one or more channels, wherein the one or more first attachment fittings extend through the one or more channels, wherein the one or more first attachment fittings are secured to the one or more couplers through one or more frangible fasteners.

Clause 19. The aircraft of Clause 18, wherein the upper blade comprises one or more second attachment fittings secured to the one or more couplers.

Clause 20. The aircraft of Clause 19, wherein the one or more couplers secure to the one or more second attachment fittings of the upper blade through one or more fasteners.

As described herein, examples of the present disclosure provide an improved winglet system. Further, examples of the present disclosure provide systems and methods for effectively and efficiently compensating for a removed lower blade of a winglet.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, aft may be changed to forward, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A winglet system configured to be secured to a distal end of a wing of an aircraft, the winglet system comprising:

an upper blade;

a lower blade; and a cover plate integrally formed with the upper blade and the lower blade, wherein the cover plate is disposed within an opening that extends into, within, and through a transition joint between the upper blade and the lower blade, wherein the cover plate covers the opening, and wherein the cover plate remains coupled to the upper blade if the lower blade is separated from the winglet system, wherein the upper blade, the lower blade, and the cover plate are configured to be secured to the distal end of the wing of the aircraft.

2. The winglet system of claim 1, wherein the cover plate comprises:

a covering panel disposed within the opening, wherein the covering plate conforms to a size and a shape of the opening; and one or more couplers extending from the covering panel.

3. The winglet system of claim 2, wherein the one or more couplers comprise:

a first coupler; and a second coupler.

4. The winglet system of claim 2, wherein the one or more couplers comprise legs separated by a gap.

5. The winglet system of claim 2, wherein the lower blade comprises one or more attachment fittings secured to the one or more couplers.

6. The winglet system of claim 5, wherein the covering panel comprises one or more channels, and wherein the one or more attachment fittings extend through the one or more channels.

7. The winglet system of claim 5, wherein the one or more attachment fittings are secured to the one or more couplers through one or more frangible fasteners.

8. The winglet system of claim 2, wherein the upper blade comprises one or more attachment fittings secured to the one or more couplers.

9. The winglet system of claim 2, wherein the one or more couplers secure to one or more first attachment fittings of the upper blade through one or more first fasteners, wherein the one or more couplers secure to one or more second attachment fittings of the lower blade through one or more second fasteners, and wherein the one or more first fasteners are different than the one or more second fasteners.

10. The winglet system of claim 9, wherein the one or more first attachment fittings do not extend to or contact the one or more second attachment fittings.

11. The winglet system of claim 2, wherein at least one fastener secures the one or more couplers to one or more first attachment fittings of the upper blade and one or more second attachment fittings of the lower blade.

12. The winglet system of claim 11, wherein one or more retaining fasteners secure the one or more couplers to the one or more first attachment fittings of the upper blade, and wherein the one or more retaining fasteners do not connect to the one or more second attachment fittings of the lower blade.

13. The winglet system of claim 2, wherein an entirety of the covering panel has a profile shaped as an airfoil.

14. A method for a winglet system configured to be secured to a distal end of a wing of an aircraft, the method comprising:

integrally forming a cover plate with an upper blade and a lower blade; and disposing the cover plate within an opening that extends into, within, and through a transition joint between the upper blade and the lower blade, wherein the cover plate cover the opening, and wherein the cover plate remains coupled to the upper blade if the lower blade is separated from the winglet system; and securing the winglet system including the cover plate, the upper blade, and the lower blade to the distal end of the wing.

15. An aircraft comprising:

a fuselage;

wings extending from the fuselage; and a winglet system secured to a distal end of each of the wings, the winglet system comprising:

an upper blade;

a lower blade; and a cover plate integrally formed with the upper blade and the lower blade, wherein the cover plate is disposed within an opening that extends into, within, and through a transition joint between the upper blade and the lower blade, wherein the cover plate covers the opening, and wherein the cover plate remains coupled to the upper blade if the lower blade is separated from the winglet system, wherein the upper blade, the lower blade, and the cover plate are secured to the distal end.

16. The aircraft of claim 15, wherein the cover plate comprises:

a covering panel disposed within the opening, wherein the covering plate conforms to a size and a shape of the opening; and one or more couplers extending from the covering panel.

17. The aircraft of claim 16, wherein the one or more couplers comprise:

a first coupler; and a second coupler.

18. The aircraft of claim 16, wherein the one or more couplers comprise legs separated by a gap.

19. The aircraft of claim 16, wherein the lower blade comprises one or more first attachment fittings secured to the one or more couplers, wherein covering panel comprises one or more channels, wherein the one or more first attachment fittings extend through the one or more channels, wherein the one or more first attachment fittings are secured to the one or more couplers through one or more frangible fasteners.

20. The aircraft of claim 19, wherein the upper blade comprises one or more second attachment fittings secured to the one or more couplers.

21. The aircraft of claim 20, wherein the one or more couplers secure to the one or more second attachment fittings of the upper blade through one or more fasteners.

* * * * *